US009509793B2

(12) United States Patent
Brown et al.

(10) Patent No.: US 9,509,793 B2
(45) Date of Patent: Nov. 29, 2016

(54) CONTENT CACHING IN A NETWORK FOR EFFICIENT USER DEVICE ACCESS

(71) Applicant: Verizon Patent and Licensing Inc., Arlington, VA (US)

(72) Inventors: Mark Steven Brown, Post Falls, ID (US); Selvaraj Raghuraman, Fremont, CA (US); Brent Richard Peterson, Riverview, FL (US); William S Downey, Franklin, MA (US); Bernard Jablonka, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 14/088,017

(22) Filed: Nov. 22, 2013

(65) Prior Publication Data

US 2015/0149581 A1    May 28, 2015

(51) Int. Cl.
*G06F 15/16* (2006.01)
*H04L 29/08* (2006.01)
*H04L 29/06* (2006.01)
*H04N 21/472* (2011.01)

(52) U.S. Cl.
CPC .......... *H04L 67/28* (2013.01); *H04L 65/4069* (2013.01); *H04L 65/4084* (2013.01); *H04L 65/60* (2013.01); *H04L 65/607* (2013.01); *H04N 21/47202* (2013.01)

(58) Field of Classification Search
CPC .......... H04L 65/4069; H04L 65/4084; H04L 67/28; H04L 65/4076; H04L 65/602; H04L 65/607; H04L 65/60; H04N 7/17318; H04N 21/47202; H04N 7/173

USPC ............... 709/219, 231, 217; 370/390, 332; 375/240; 725/94
See application file for complete search history.

(56) References Cited

U.S. PATENT DOCUMENTS

| 8,205,004 B1* | 6/2012 | Kaufman ............. H04L 65/607 375/240 |
| 2009/0292819 A1* | 11/2009 | Kandekar .......... H04N 7/17318 709/231 |
| 2013/0013799 A1* | 1/2013 | Keum ................. H04L 65/4076 709/231 |
| 2013/0198789 A1* | 8/2013 | Streeter .................. H04N 7/173 725/94 |
| 2014/0286316 A1* | 9/2014 | Park ..................... H04W 76/026 370/332 |
| 2014/0344410 A1* | 11/2014 | Saremi .................. H04L 65/602 709/219 |
| 2014/0355603 A1* | 12/2014 | Li ......................... H04L 12/184 370/390 |

* cited by examiner

*Primary Examiner* — Jungwon Chang

(57) ABSTRACT

Content (e.g., files such as streaming audio or video) may be efficiently cached and delivered in a network. In one implementation, a method may include receiving, from a requesting computing device, a request for a segment of a content item, the request indicating one or more positions in the content item that define the segment of the content item. The method may further include determining a second segment of the content item, different from the first segment of the content item, in which the second segment of the content item is aligned so that an end position of the second segment of the content item matches an end position of one of a number of predetermined segments for the content item. The method may further include obtaining the second segment of the content item and transmitting the obtained second segment of the content item to the requesting computing device.

20 Claims, 8 Drawing Sheets

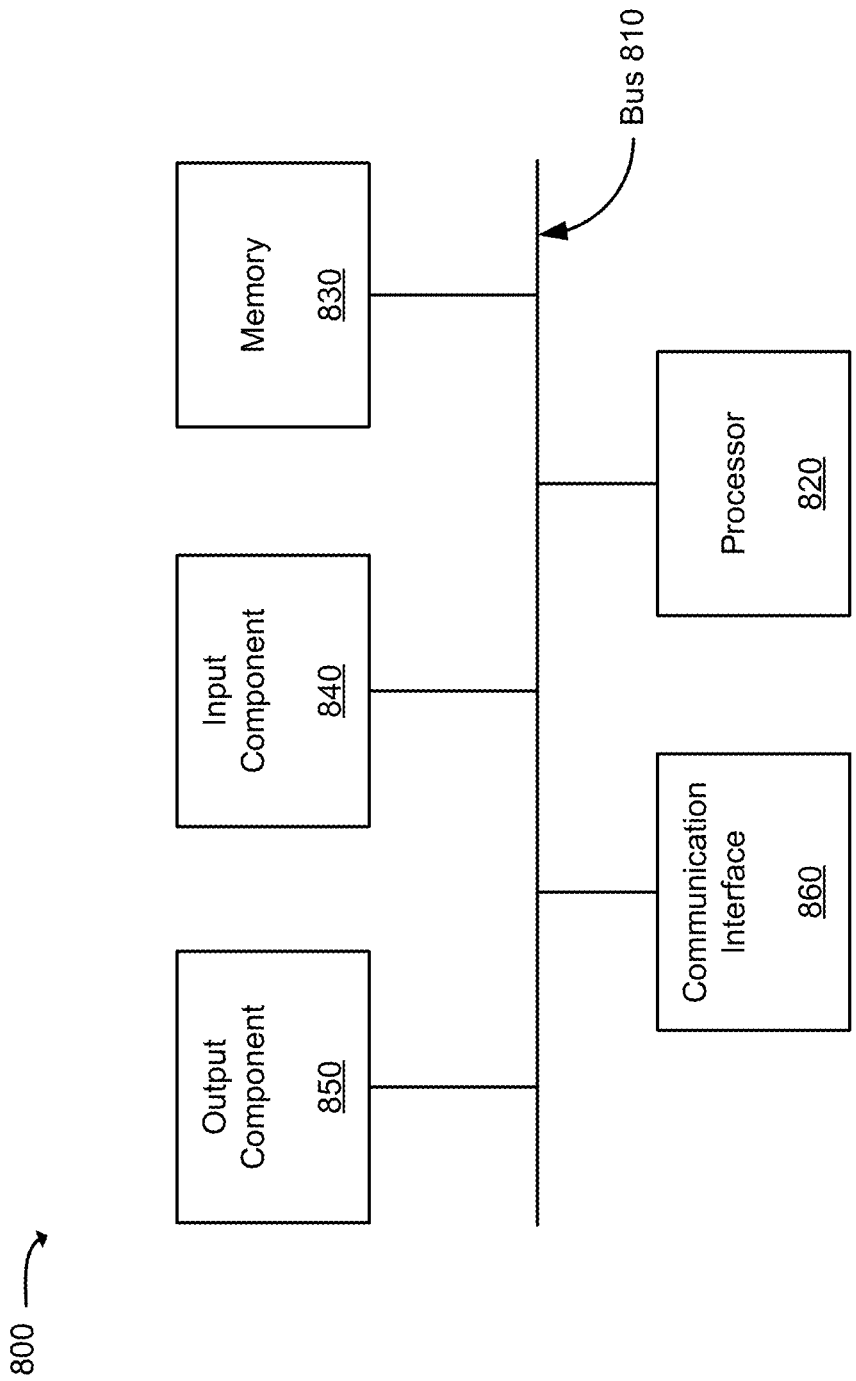

CONTENT CACHING IN A NETWORK FOR EFFICIENT USER DEVICE ACCESS

BACKGROUND

Wide area communication networks are frequently used to deliver content to user devices. Delivery of large content files, such as streaming video files, can put a strain on the communication networks. One technique for relieving network strain caused by transmitting large, high-bandwidth files (e.g., streaming video) is based on the caching of the content by the network. When caching content, the network may include a number of caching nodes that are located on an "edge" portion of the network (e.g., near the final user devices to which the content is delivered). The caching nodes may store local copies of the content that is frequently requested. In this manner, a subsequent request of the same content (by a same or different user device) may be satisfied from a caching node located close to the requesting user device, which may relieve network strain on a core portion of the network.

BRIEF DESCRIPTION OF THE DRAWINGS

FIG. 8 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques are described herein in which content (e.g., files such as streaming audio or video) may be efficiently transmitted through a network, such as a wide area network (WAN). Computing devices (e.g., devices associated with end-users), may request content, such as streaming audio or video content, using a number of possible content delivery techniques (e.g., delivery protocols). The content requests provided by some of the content delivery techniques may result in inefficient caching of the content by the network or in an inability of the network to cache the content. Consistent with aspects described herein, content requests may be reformatted such that the content requests may result in more efficient caching of the requested content but still result in content that can be provided to and used by the computing devices.

Figure 1:
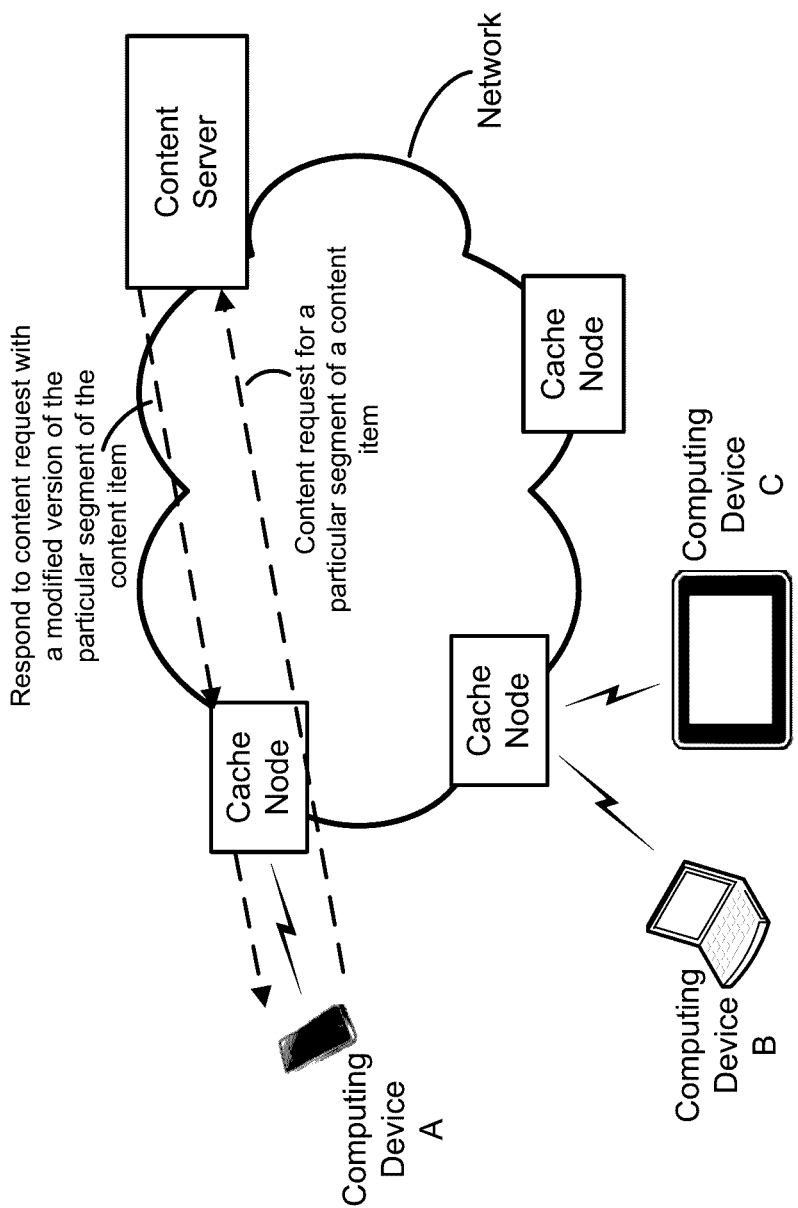
FIG. 1 is a diagram illustrating an overview of concepts described herein.

FIG. 1 is a diagram illustrating an overview of concepts described herein. As illustrated, a content server may provide content (e.g., streaming video content), over a network, to computing devices (labeled in FIG. 1 as Computing Device A, Computing Device B, and Computing Device C). In order to more efficiently deliver the content to the computing devices, an operator of the network may enable network caching of the content. As illustrated, the caching may be performed by one or more cache nodes. The cache nodes may generally represent network devices or processes that are implemented near an "edge" of the network (e.g., at a physical location in the network that is near the computing devices). When a content item is requested by a particular computing device, the network may, in addition to delivering the content item to the requesting computing device, store a copy of the content item in a cache node. Subsequent requests for the same content item, such as a subsequent request by a different computing device that is located near the cache node that stored the copy of the content item, may be delivered directly to the computing device from the cache node, potentially without burdening the content server and/or the core of the network.

As illustrated in FIG. 1, a computing device ("Computing Device A") may transmit a content request, for a particular segment of a content item (e.g., a subset of the content item), to the content server. The request may be forwarded or examined by a cache node which, in this example, may determine that the particular segment of the content item is not available in the cache node. As an example of the content request, the content request may include an identification of a particular content item (e.g., a particular video file) and a particular segment of the video file (e.g., a byte range that identifies a segment of the video file). In the situation in which Computing Device A is receiving the video file as streaming video, Computing Device A may issue multiple requests for consecutive segments of the video file that together act to stream the complete video file to Computing Device A.

The content request may be handled by the content server using one of a number of "handler" processes, where each handler process may correspond to a particular protocol being used by Computing Device A to request the content. In some implementations, a handler process may respond to the content request by inspecting the content request to determine a segment of the content item to return for caching. The returned segment may have segment boundaries that are different than what was included in the original content request. The segment boundaries may be optimized for caching. For example, the handler may reformat content requests such that the segment of the content item being requested is modified to end on one of a number of predetermined segment boundaries for the content item. Accordingly, a subsequent request for a next segment of the content item, from Computing Device A, may tend to start at a segment boundary corresponding to the predetermined segment boundaries. Alternatively or additionally, the content item being requested may be selected to enforce other restrictions, such as the segment of the content item conforming to a maximum size restriction. In this manner, multiple requests for the same content item, from different computing devices, may be standardized so that the requests occur along the predetermined segment boundaries. Having multiple requests along the same predetermined segment boundaries may allow the cache nodes to effectively cache the segments of the content items (i.e., by "forcing" content requests to conform to standardized boundaries, content segments stored in the cache nodes may result in relatively frequent cache hits).

In some implementations, the cache nodes may also have the ability to cache large content items (e.g., greater than two gigabytes). Caching large content items may be particularly effective at relieving network strain through the core of the network.

Figure 2:
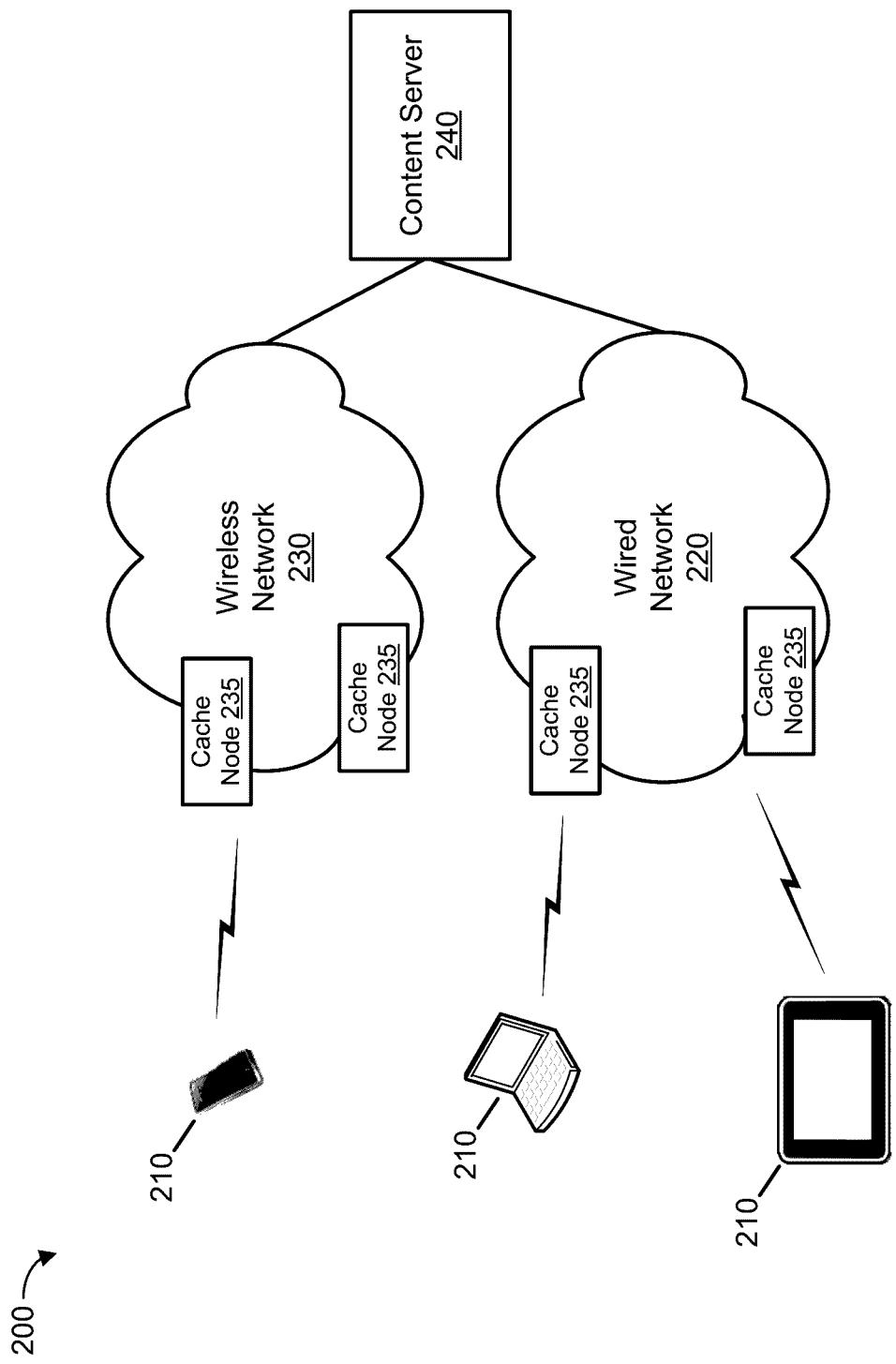
FIG. 2 illustrates an example environment in which systems and/or methods described herein may be implemented.

FIG. 2 illustrates an example environment 200 in which systems and/or methods described herein may be implemented. As shown in FIG. 2, environment 200 may include a number of computing devices 210 (which may be referred to collectively as "computing devices 210" or individually as "computing device 210"). Network connectivity may be provided to computing devices 210 using a number of possible network technologies, such as via wired network 220 and/or wireless network 230. Content server 240 may connect, through wired network 220 and/or wireless network 230, to computing devices 210.

Computing devices 210 may each include a communication and/or computing device that is capable of connecting to wireless network 230 or wired network 220. In one implementation, computing device 210 may include a smart phone, a personal digital assistant ("PDA") (e.g., that can include a radiotelephone, a pager, Internet/intranet access, etc.); a laptop computer; a desktop computer; a tablet computer; or another type of computation and communication device. In some implementations, computing device 210 may include multiple radio interfaces, which may allow mobile device 210 to connect to multiple different wireless networks (e.g., to a cellular network corresponding to wireless network 230 and to a local wireless network (e.g., Wi-Fi) that is coupled to wired network 220).

Wired network 220 may include one or more networks, such as a local area network ("LAN"), a WAN—such as the Internet, or another type of network. Wired network 220 may provide network connectivity, to computing devices 210, via a wired connection. For example, an operator of wired network 220, such as a telecommunications company, may provide network connectivity to a customer premises, that includes computing devices 210, by installing copper twisted pair cables, power line cabling, coaxial or fiber cables to the customer premises.

Wireless network 230 may include one or more networks that provide wireless network connectivity to computing devices 210. For example, wireless network 230 may represent a wireless network that provides cellular wireless coverage. In some implementations, wireless network 230 may be associated with an evolved packet system ("EPS") that includes a Long Term Evolution ("LTE") network and/or an evolved packet core ("EPC") network that operate based on a Third Generation Partnership Project ("3GPP") wireless communication standard.

Wired network 220 and/or wireless network 230 may each be associated with a number of network devices, labeled as cache nodes 235 (which may be referred to collectively as "cache nodes 235" or individually as "cache node 235") in FIG. 2, that provide caching services for networks 220 and/or 230, and/or for content server 240. Cache nodes 235 may be physically located near an edge of wired network 220 and/or wireless network 230 in order to deliver content to computing devices 210 in a manner that minimizes the usage of wired network 220 and/or wireless network 230. In general, cache node 235 may store a copy of content that is delivered to one or more computing devices 210 in the vicinity of the cache node. Additional requests for the content may be delivered directly from the cache node (i.e., without having to access content server 240 over wired network 220 and/or wireless network 230).

Content server 240 may include one or more computing devices that provide content, such as streaming video and/or streaming audio, images, binary files, or other content, to computing devices 210. Although referred to as a "server" herein, content server 240 may include a single computing device, clusters of computing devices (e.g., blades or rack-mounted server computers) that are co-located or geographically distributed, cloud-based (e.g., computing as a service) computing solutions, or other arrangements of computing devices. In one implementation, and as described in more detail herein, content server 240 may function as a content server that provides streaming video (or audio) files to computing devices 210. A particular streaming video file may be provided as a number of consecutive segments of an entire media file (e.g., the file that represents the entire video).

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices illustrated in FIG. 2 may perform one or more functions described as being performed by another one or more of the devices illustrated in FIG. 2. The illustrated devices may interconnect via wired connections, wireless connections, or a combination of wired and wireless connections.

Figure 3:
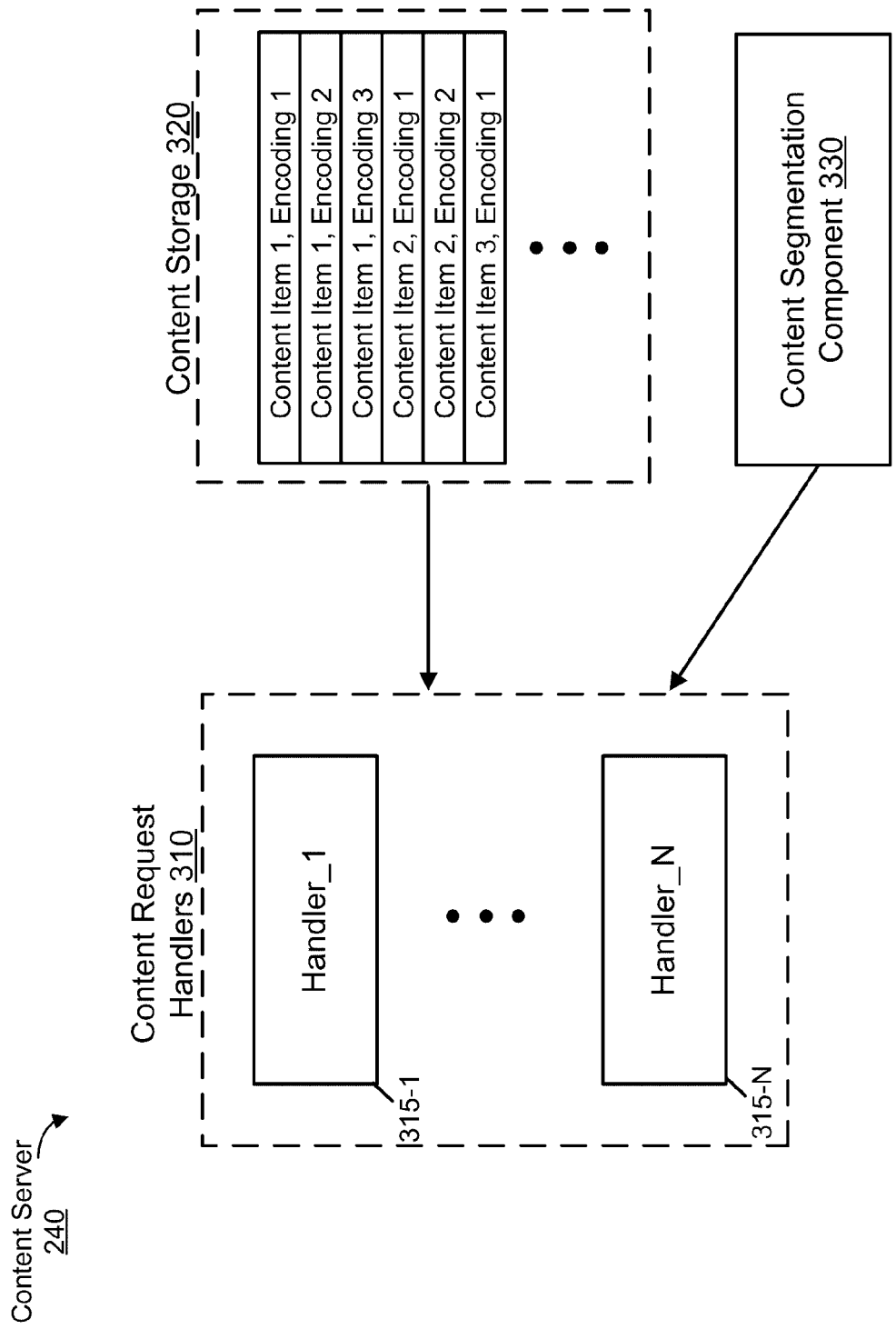
FIG. 3 is a diagram illustrating an example of functional components that may be included within the content server shown in FIG. 2.

FIG. 3 is a diagram illustrating an example of functional components that may be included within content server 240. Content server 240 may include content request handlers 310, content storage 320, and content segmentation component 330. In other implementations, content server 240 may include other or additional components than those illustrated in FIG. 3.

Content request handlers 310 may include logic to receive and process content requests from computing devices 210. A number of handlers are shown in FIG. 3, illustrated as handlers 315-1 (handler_1) through handler 315-N (handler_N) (which may be referred to collectively as "handlers 315" or individually as "handler 315"). Each handler 315 may be designed to operate with a particular content delivery protocol or technology. For example, a first handler 315 may operate to handle content requests using the hypertext transfer protocol (HTTP) Live Streaming (HLS) protocol, a second handler 315 may operate to handle content requests from clients using the Adobe Flash platform (available from Adobe Corporation), and a third handler 315 may operate to handle content requests from clients implementing the VUDU LiveStream protocol (available from Vudu, Inc.).

In general, each handler 315 may operate to receive content requests from clients, such as computing devices 210, and to respond to the content requests by transmitting the requested content item (e.g., a file or segment of a file) to computing devices 210. For streaming content, such as streaming video, the response may include a portion (segment) of the entire content item. For example, computing device 210 may request a particular range of a particular content item (e.g., bytes zero to 400 kilobytes from a video file). Handler 315 may segment the particular content item based on the requested range and return the segment of the content item ("content segment") to the corresponding computing device 210.

In some implementations, handler 315 may not honor the requested segment range from the content request and may instead use a range that is compatible with efficient caching of the content segments by cache nodes 235. For example, as will be described in more detail below, handler 315 may reformat the requested content range (e.g., byte range) into a form in which each segment ends on a predetermined segment breakpoint (also called "segment boundary" herein) for the content item.

As another example, handler 315 may reformat the requested content range into a form in which each segment is determined based on another consideration, such as limiting the file size of a segment. For instance, the predefined segment boundary may result in a 15 MB file. Handler 315 may, however, limit the segment size to a maximum of 10 MB. In this case, handler 315 may determine the segment size as the maximum of 10 MB or a size that ends on the next segment breakpoint.

Handlers 315, when transmitting segments of content items in response to the content requests, may include cache-control headers with the requests. The cache-control headers may include instructions to downstream network elements (e.g., cache nodes 235) relating to caching of the content segments. For example, a cache-control header may include an indication of whether the corresponding content segment is eligible to be cached. As another example, the cache control header may indicate an expiration date or period that indicates how long the content segment can be cached (e.g., the content segment should be removed from the cache after a certain date/time and/or after a certain time period). In one implementation, for HTTP-based content delivery, the cache-control headers may be implemented as HTTP headers.

Content server 320 may include logic and/or storage to store the content that is provided by content server 240. In one implementation, content storage 320 may store a number of video files (i.e., content server 320 may implement a video or move distribution service). Alternatively or additionally, different types of files may be maintained by content storage 320. In order to facilitate the streaming of the video files during varying network conditions, multiple copies of the video files may be maintained by content storage 320. Each copy may be encoded using a different encoding technique and/or resolution. For example, a video file may be encoded using the H.264/Moving Picture Experts Group-4 (H.264/MPEG-4) encoding standard. The video file may be encoded multiple times using different encoding resolutions. In the example of FIG. 3, the content item (e.g., a video file) labeled "Content Item 1" may be stored in a manner that includes three different encoding rates, labeled as "encoding 1," "encoding 2," and "encoding 3." As one example, "encoding 1" may correspond to the video file encoded at 400 kilobits per second (Kbps), "encoding 2" may correspond to the video file encoded at 800 Kbps, and "encoding 3" may correspond to the video file encoded at 1200 Kbps. In general, higher encoding rates may result in files that are larger but that when downloaded, may be viewable at higher resolutions. In FIG. 3, a second content item (e.g., a second video file) is illustrated as "Content Item 2" and is associated with two different encodings ("encoding 1" and "encoding 2").

Content segmentation component 330 may include logic to store and/or provide segment information relating to the content stored by content storage 320. The segment information may include information defining break points in the content items. For video files, the break points may correspond to locations in the video files that may be used to insert advertisements or change encoding bit rates. The break points may occur at identical locations across multiple encodings of a content item. For example, "Content Item 1" may include a break point at the one minute point into the content item (e.g., when the content item is a video) even though the one minute point may correspond to different byte locations in "encoding 1," "encoding 2," and "encoding 3." In this manner, a user viewing "Content Item 1" can dynamically switch encoding bit rates during the playback of the content item without disrupting the substantive content (e.g., the story) provided by the content item.

Figure 4:
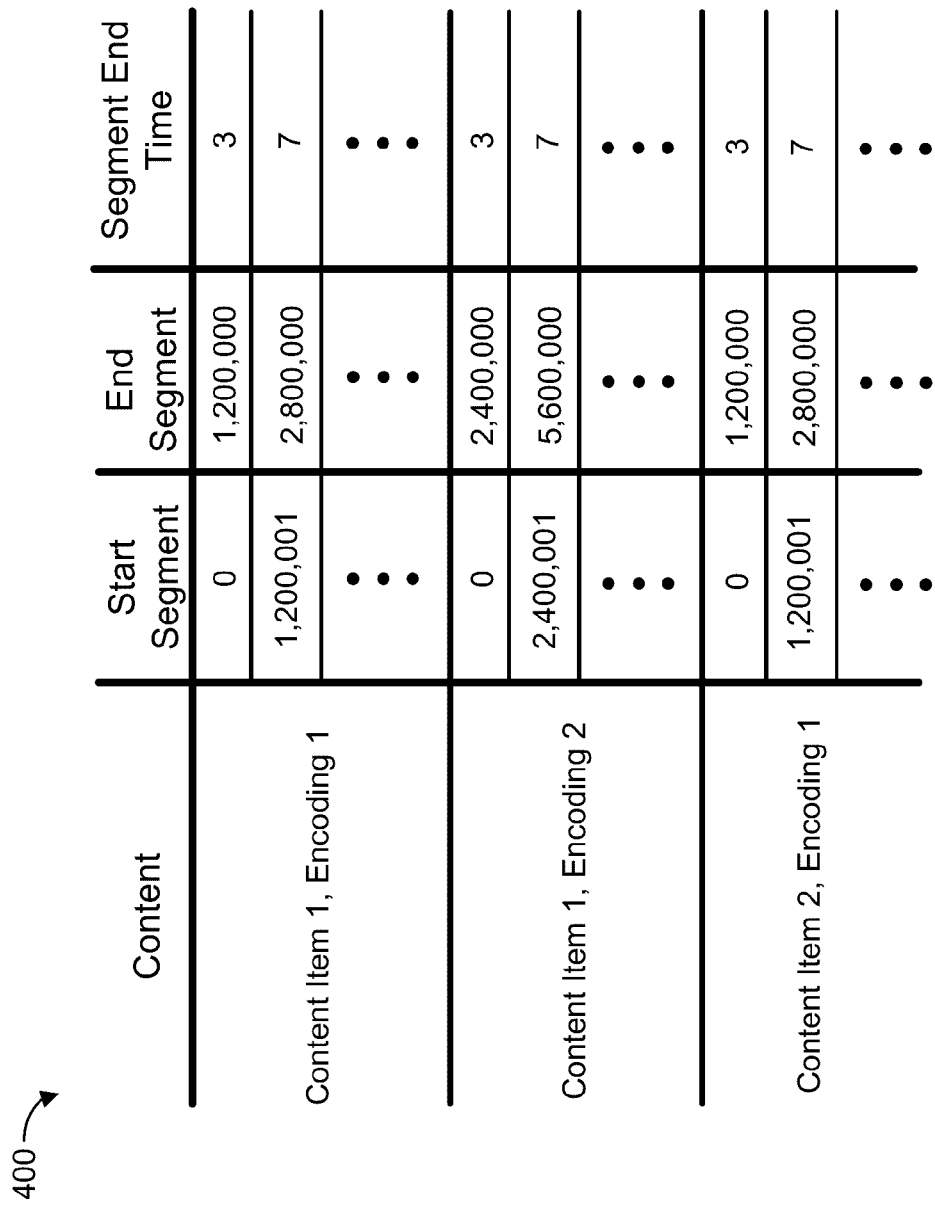
FIG. 4 is a diagram illustrating an example data structure for storing information defining segments of content.

FIG. 4 is a diagram illustrating an example data structure 400, such as a data structure that may be maintained by content segmentation component 330. Data structure 400 may generally be used to store information defining the segments (and the break points between segments) for each content item and encoding. As previously mentioned, for video files, the break points may correspond to locations in the video files that may be used to insert advertisements or change encoding bit rates when streaming the video files. Additionally, in some implementations, handlers 315 may only return content item segments that correspond to the segments defined by data structure 400. By enforcing network level segment breaks, the content segments stored by cache nodes 235 may tend to result in a relatively high rate of cache hits (i.e., a requested content segment matches a previously cached content segment), which may enable effective caching by cache nodes 235.

As illustrated, data structure 400 may include a number of fields, including: a content field, a start segment field, an end segment field, and a segment end time field. The fields shown for data structure 400 are examples. In alternative possible implementations, different, fewer, or additional fields may be implemented.

Each entry in the content field may identify a particular content item and encoding. The segment breaks may thus be defined on a per-content item and encoding basis. As illustrated, each content item, such as "content item 1, encoding 1" may be associated with a number of segments, in which a start and end position of each segment is provided in the start segment and end segment fields, respectively. In one implementation, the start and end segment values may be specified as byte values (i.e., the number of bytes into the file). For example, the content item "content item 1, encoding 1" may include the segment that begins at byte zero (the beginning of the file) and ends at byte 1,200,000. The next segment may begin at byte 1,200,001 and end at byte 2,800,000. As illustrated in the segment end time field, the first segment may end three seconds into the video and the second segment may end at the seven second point in the video. The content item "content item 1, encoding 2" may correspond to the same video as "content item 1, encoding 1," but may be encoded differently (e.g., at a higher bit rate). The first segment of this video may begin at byte zero (the beginning of the file) and end at byte 2,400,000. The next segment may begin at byte 2,400,001 and end at byte 5,600,000. The first and second segments for "content item 1, encoding 1" and "content item 2, encoding 2" may end at the same break times (e.g., three and seven seconds from the beginning of the video).

Data structure 400 illustrates an example of predetermined segment boundaries for content items. Alternatively, instead of using predetermined segment boundaries stored in a data structure, segment boundaries for content items may be dynamically determined for content items based on a rule set. For example, handlers 315 may dynamically determine the segment boundaries for a content item may be on a rule that defines each segment as being of a certain size (e.g., 10 MB).

Figure 5:
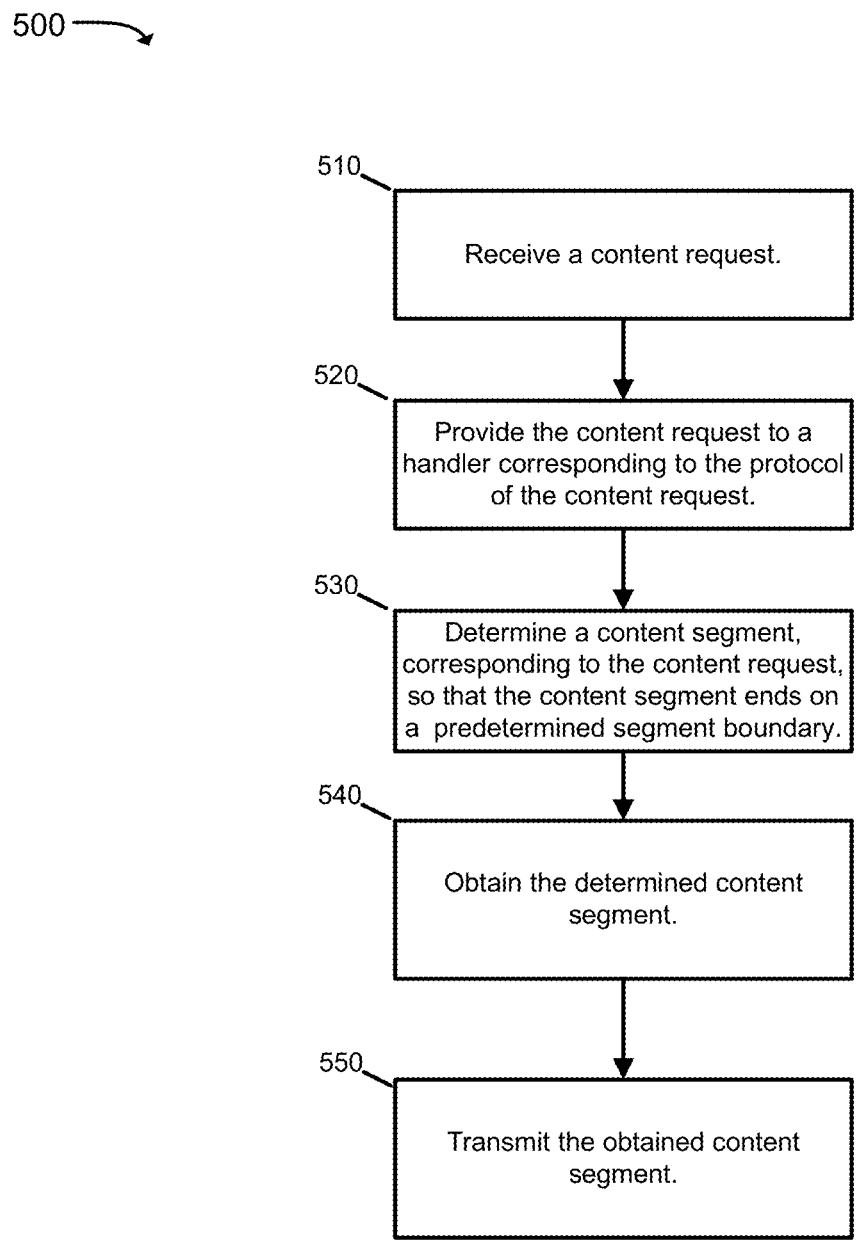
FIG. 5 is a flow chart illustrating an example process relating to the operation of content request handlers in receiving and responding to content requests.

FIG. 5 is a flow chart illustrating an example process 500 relating to the operation of content request handlers 315 in receiving and responding to requests for content from computing devices 210.

Process 500 may include receiving a content request (block 510). The content request may be received directly or indirectly from computing device 210 (e.g., via cache node 235). As previously mentioned, the content request may be a request for streaming media (e.g., streaming audio or video) made pursuant to one of a number of protocols (e.g., the HLS protocol, Adobe Flash, Vudu LiveStream). In some protocols, the content request may include an indication of a particular content segment (e.g., a byte range) of the content item being requested. In addition to identifying the content item, the content request may identify the particular encoding of the content item.

Process 500 may further include providing the content request to an appropriate handler for the content request (block 520). In one implementation, a separate handler 315 may be implemented for each content request protocol. The received content request may be forwarded to the handler 315 that corresponds to the protocol of the content request.

Process 500 may further include determining a content segment, corresponding to the content request, so that the requested content ends on a predetermined segment boundary for the content item (block 530). The determined content segment may not match the segment specified in the received content request. Alternatively or additionally, the determined content segment may be based on the enforcement of other rules that are implemented by handler 315, such as file size limitations. For example, handler 310 may determine, based on data structure 400, the current segment corresponding to the beginning of the content request. Handler 310 may then modify the content request to extend from the beginning of the content request to the end of the current segment (i.e., potentially disregarding the end position that is indicated in the received content request). Alternatively, handler 315 may modify the content request to extend from the beginning of the current segment to the end of the segment after the current segment.

Process 500 may further include obtaining the determined content segment (block 540). In one implementation, the content segment may be a dynamically extracted segment from the content item, such as by handler 315 extracting the segment from the corresponding content item stored by content storage 320. In some implementations, blocks 530 and 540 may be implemented as a single operation. For example, instead of modifying the content request and then extracting the content segment based on the modified content request, handler 315 may determine the segment to extract and may extract the segment without explicitly modifying the content request.

Process 500 may further include transmitting the obtained content segment to the computing device 210 that initiated the content request (block 550). The extracted content segment may be transmitted as a response to the content request and may include cache-headers or other control information that indicates how downstream devices, such as cache nodes 235, are to handle caching of the content segment.

As an example of the operation of blocks 530 and 540, consider a content request for a content item illustrated in FIG. 4 ("content item 1, encoding 1") and for the segment range 600,010 to 15,321,421. Handler 315 may determine that this content request corresponds to the first segment of this content item and encoding (e.g., the content item ending at three seconds). Handler 315 may then extract the content segment extending from byte 600,010 to byte 1,200,000 and may transmit this extracted content segment back to the requesting computing device 210. The response may include a cache-header that indicates "no caching," as the particular range of the segment may be unlikely to be requested again by another computing device 210 (e.g., the content segment is not a "standard segment" from data structure 400). The next content request from computing device 210 may include a segment range that begins after the last received byte (e.g., byte 1,200,001) and ends at a later position in the content item, such as byte 17,333,100. Handler 315 may determine that this content request corresponds to the second segment of "content 1, encoding 1". Handler 315 may then extract the segment beginning at byte 1,200,001 and ending at byte 2,800,000 and may transmit the extracted segment back to the requesting computing device 210.

The response may include a cache-header that indicates the segment should be cached, as the segment is a standard segment (from data structure 400) and may be likely to be later requested by computing device 210 or another computing device 210. In this manner, subsequent content requests from computing device 610 may continue to be aligned to the segment boundaries indicated in data structure 400, and may thus result in content item segments that are good candidates for being cached.

Figure 6:
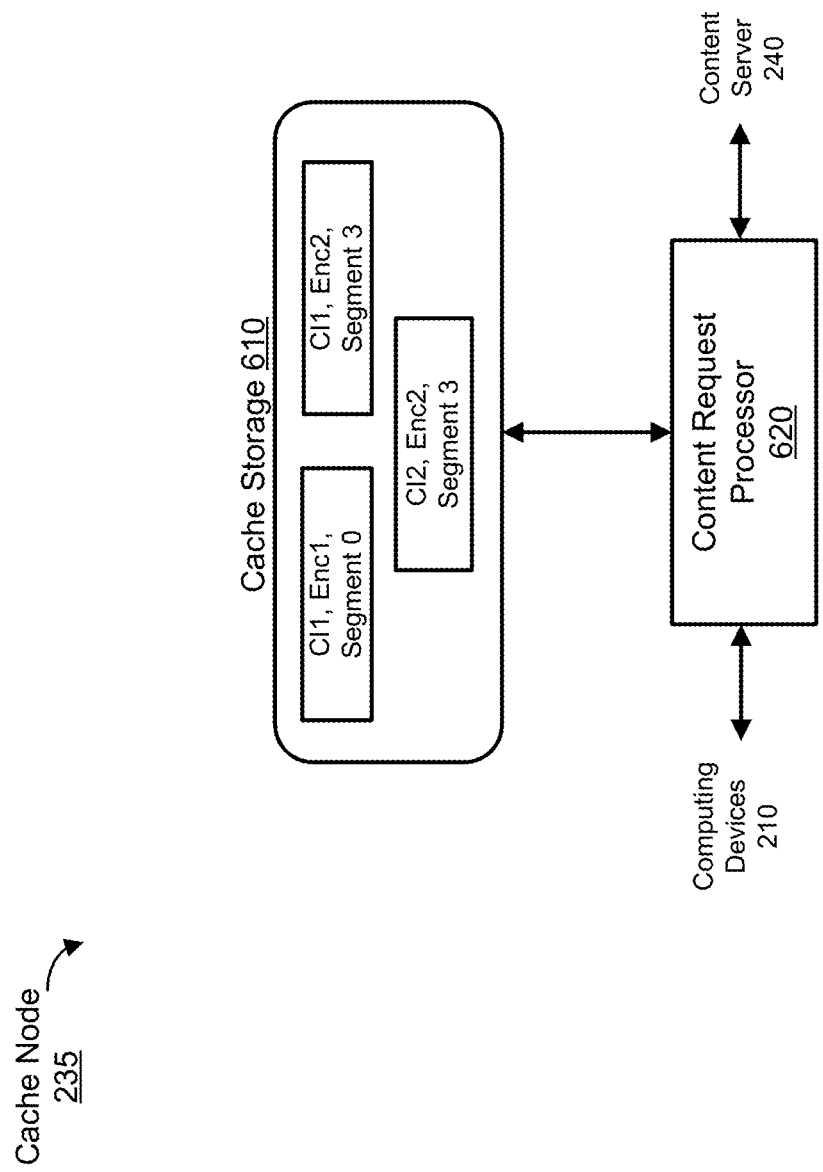
FIG. 6 is a diagram illustrating an example of functional components that may be included within a cache node in the environment of FIG. 2.

FIG. 6 is a diagram illustrating an example of functional components that may be included within cache node 235. Cache node 235 may include cache storage 610 and content request processor 620. In other implementations, cache node 235 may include other or additional components than those illustrated in FIG. 3.

Cache storage 610 may include processing and/or storage to store (cache) content segments that are provided by content server 240 to computing devices 210. As previously mentioned, content server 240 may respond to content requests, from computing devices 210, by extracting content segments and transmitting the content segments to computing devices 210. The transmitted content segments may include cache-header information and may be routed through cache node 235. Based on the cache-header information, cache node 236 may determine whether to store the content segments in cache storage 610.

In one implementation, the content segments stored by cache storage 610 may each be associated with a particular content item ("CI"), a particular encoding format ("Enc"), and a particular predetermined segment (e.g., as defined in data structure 400) of the particular content item. For example, as illustrated in FIG. 6, one example content segment may be associated with the first segment ("Segment 0") of the content item labeled "CI1" (e.g., "content item 1"), which may be encoded using a first encoding scheme ("Enc1"). Similarly, another cached segment may be associated with the third segment ("Segment 3") of the content item "CI1", which may be encoded using a second encoding scheme ("Enc2"); and another cached segment may be associated with the third segment ("Segment 3") of the content item "CI2" ("content item 2"), which may be encoded using a second encoding scheme ("Enc2").

Content request processor 620 may include logic to receive content requests from computing devices 210, determine whether the content requests correspond to content that is stored in cache storage 610, and when the content requests are stored in cache storage 610, respond to the content requests from cache storage 610 without using resources of content server 240. Additionally, content request processor 620 may operate to, when a received content request cannot be satisfied based on the content stored in cache storage 610, forward the content request to content server 240. Also, when content is received from content server 240, content request processor 620 may forward the content to the corresponding destination computing device 210 and potentially store (cache) the content in cache storage 610. The operation of content request processor 620 will be described in more detail below with reference to the flow chart of FIG. 7.

Figure 7:
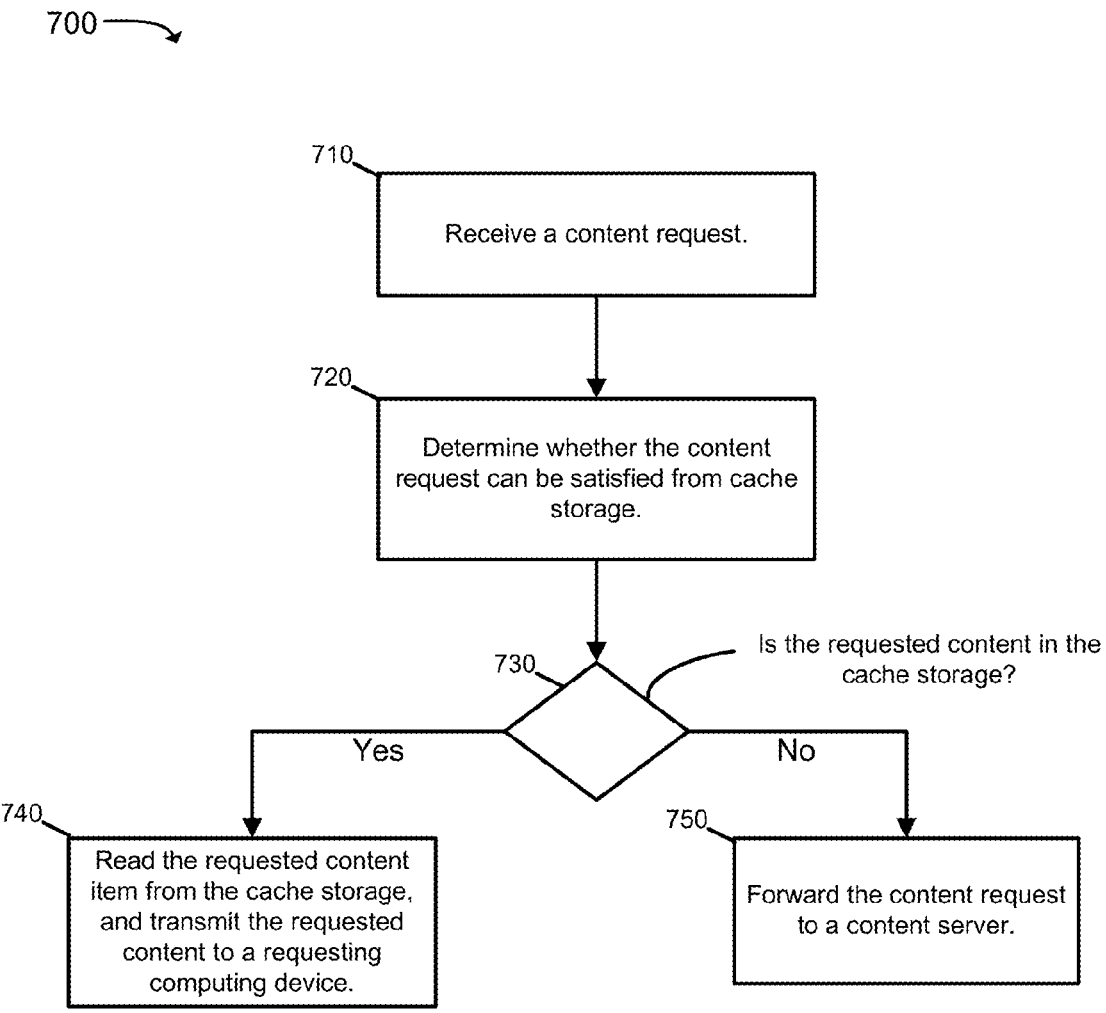
FIG. 7 is a flow chart illustrating an example process relating to the operation of a cache node.

FIG. 7 is a flow chart illustrating an example process 700 relating to the operation of a cache node in environment 200. In one implementation, process 700 may be performed by cache node 235.

Process 700 may include receiving a content request from one of computing devices 210 (block 710). The content request may be a request for streaming media made pursuant to one of a number of protocols. The content request may include an indication of a particular segment or portion of the content item being requested (e.g., a byte range). In addition to identify the content item, the content request may identify the particular encoding of the content item.

Process 700 may further include determining whether the content request can be satisfied from cache storage (block 720). In one implementation, content request processor 620 may determine that the content request can be satisfied from the cache storage when a location (e.g., a byte value or time value) of the beginning of the requested content item matches the beginning of a cached segment (and the content item and encoding match the cached segment) in cache storage 610. The location of the beginning of the requested content item may be obtained from the content request. The location of the end of the content segment, which may also be potentially included in the content request, may be ignored and instead the end of the cached segment in cache storage 610 may be effectively used in the returned content item.

When it is determined that the content item or content segment, corresponding to the content request, is in the cache storage (block 730—Yes), process 700 may further include reading the content item from the cache storage, and transmitting the content item to the requesting computing device (block 740). This situation may correspond to a "cache hit" in which the content request does not need to be forwarded to content server 240, potentially saving network resources and resources of content server 240.

When it is determined that the content item, corresponding to the content request, is not in the cache storage (block 730—No), process 700 may further include forwarding the content request to the content server (block 750). As discussed above with respect to process 500, content server 240 may obtain the requested segment, corresponding to the content item, and forward the requested segment to the requesting computing device 210. Cache node 235, such as content request processor 620 of cache node 235, may also receive, forward, and/or store the requested segment in cache storage 610.

In some implementations, cache nodes 235 may be configured to cache relatively large content items, such as files greater than two gigabytes. For example, some content requests may not specify a segment range for a content item (e.g., the content request may be an HTTP GET request that does not include a byte range). These requests may trigger the transmission of the entire content item to the requesting computing device. Cache nodes 235 may correspondingly cache the entire content item as a single cache entry.

In some situations, multiple computing devices 210 may simultaneously request the same content item or the same segment of a content item. In one implementation, a single cache node 235, that is involved in multiple simultaneous requests for a content item (or segment of the content item), may continue to cache the content item (or segment of the content item) as long as at least one of the content requests is not cancelled. Thus, if at least one of the content requests completes without being cancelled the content item (or segment of the content item) may be cached.

FIG. 8 is a diagram of example components of device 800. One or more of the devices described above (e.g., as described with respect to FIGS. 1, 2, 3, and 6) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, a Wi-Fi radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 7, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving, by one or more devices and from a requesting computing device, a request for a first segment of a content item, the request indicating one or more positions in the content item that define the first segment of the content item, the first segment of the content item including a subset of the entire content item;
determining, by the one or more devices, a second segment of the content item, different from the first segment of the content item, in which the second segment of the content item is aligned so that an end position of the second segment of the content item matches an end position of one of a plurality of predetermined segments for the content item;
obtaining the second segment of the content item; and
transmitting, by the one or more devices and in response to the request, the obtained second segment of the content item, instead of the first segment of the content item, to the requesting computing device, wherein the first segment and the second segment include different yet overlapping portions of the content item.

2. The method of claim 1, wherein obtaining the content item further includes:
extracting the second segment of the content item from a file corresponding to the content item.

3. The method of claim 1, wherein the plurality of predetermined segments are specified in a data structure or determined dynamically based on a rule.

4. The method of claim 1, wherein the content item includes an audio or video file.

5. The method of claim 1, wherein transmitting the obtained second segment further includes:
generating cache control information indicating whether the obtained second segment should be cached by cache nodes in a network that connects the cache nodes to the one or more devices.

6. The method of claim 5, wherein the generated cache control information indicates that the obtained second segment should be cached when the second is aligned with a boundary included in the plurality of predetermined segments for the content item.

7. The method of claim 1, wherein a plurality of versions of the content item are stored by the one or more devices, each of the plurality of versions corresponding to a different encoding of the content item, and wherein the method further includes:
determining, based on the request, a particular one of the plurality of versions of the content item,
wherein obtaining the second segment of the content item includes extracting the second segment of the content item from the determined particular one of the plurality of versions of the content item.

8. The method of claim 1, wherein the one or more devices include a content server to provide streaming video files.

9. A server comprising:
a memory to store instructions; and
at least one processor to execute the instructions stored by the memory to:
receive, from a requesting computing device, a request for a first segment of a content item, the request indicating one or more positions in the content item that define the first segment of the content item, the first segment of the content item including a subset of the entire content item;
determine a second segment of the content item, different from a first segment of the content item, in which the second segment of the content item is aligned so that an end position of the second segment of the content item matches an end position of one of a plurality of predetermined segments for the content item;
obtain the second segment of the content item; and
transmit, in response to the request, the obtained second segment of the content item, instead of the first segment of the content item, to the requesting computing device, wherein the first segment and the second segment include different yet overlapping portions of the content item.

10. The server of claim 9, wherein, when obtaining the second segment, the at least one processor is further to execute the instructions to:
extract the second segment of the content item from a file corresponding to the content item.

11. The server of claim 9, wherein the plurality of predetermined segments are specified in a data structure or determined dynamically based on a rule.

12. The server of claim 9, wherein the content item includes an audio or video file.

13. The server of claim 9, wherein, when transmitting the obtained second segment, the at least one processor is further to execute the instructions to:
generate cache control information indicating whether the obtained second segment should be cached by cache nodes in a network that connects the cache nodes to the one or more devices.

14. The server of claim 13, wherein the generated cache control information indicates that the obtained second segment should be cached when the second range is aligned with a boundary included in the plurality of predetermined segments for the content item.

15. The server of claim 9, wherein a plurality of versions of the content item are stored by the one or more devices, each of the plurality of versions corresponding to a different encoding of the content item, and wherein the method further includes:

determining, based on the request, a particular one of the plurality of versions of the content item, wherein obtaining the second segment of the content item includes extracting the second segment of the content item from the determined particular one of the plurality of versions of the content item.

16. A method comprising:

receiving, by a cache node in a network, a request for a first segment of a content item, the request including at least an indication of a start position and an end position of the first segment from within the entire content item;

reading, by the cache node, a second segment of the content item from local cache storage when the start position of the first segment matches a start position of the second segment, without regard to whether an end position of the first segment matches an end position of the second segment;

transmitting, by the cache node and in response to the request, when the start position of the first segment matches the start position of the second segment, the second segment of the content item, instead of the first segment of the content item, to a computing device that originated the request, wherein the first segment and the second segment include different yet overlapping portions of the content item; and requesting, by the cache node and from a network content server, content corresponding to the content item when the start position of the first segment does not match a start position of another segment, of the content item, in the local cache storage.

17. The method of claim 16, wherein segments of the content item are stored in the local cache storage based on an identification of the content item and based on an identification of an encoding scheme used to encode the content item.

18. The method of claim 16, further comprising:

receiving a second content item and cache control information from a network content server; and storing, based on the cache control information, the second content item in the local cache storage.

19. The method of claim 18, wherein the second content item is greater than two gigabytes in size.

20. The method of claim 18, wherein the content item includes a video file.

* * * * *